H. L. DOANE.
Horse Hay-Fork.
No. 79,058.
Patented June 23, 1868.
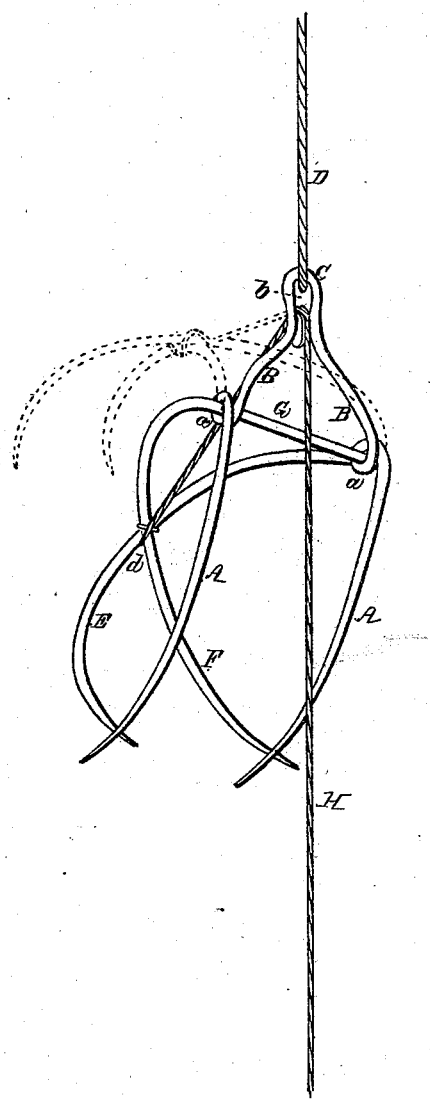

United States Patent Office.

HENRY L. DOANE, OF GREEN OAK, MICHIGAN.

Letters Patent No. 79,058, dated June 23, 1868.

IMPROVEMENT IN HORSE HAY-FORKS.

The Schedule referred to in these Letters Patent and making part of the same.

TO ALL WHOM IT MAY CONCERN:

Be it known that I, HENRY L. DOANE, of Green Oak, in the county of Livingston, and State of Michigan, have invented a new and useful Improvement in Hay-Forks; and I do hereby declare that the following is a full, clear, and exact description thereof, which will enable others skilled in the art to make and use the same, reference being had to the accompanying drawing, forming part of this specification, in which—

The figure represents a perspective view of my invention.

Similar letters of reference indicate corresponding parts.

The object of this invention is to furnish a hay-fork of the class generally known as horse hay-forks, which is simple, cheap, and efficient.

It consists of a pair of hinged or swinging tines, connected with a corresponding pair of fixed tines, the construction and operation of which will hereinafter be fully set forth.

In the accompanying drawings, A A are the fixed tines, which are bent from one continuous rod of iron, steel, or other metal, the parts B B C forming respectively the cross, arch, and eye. The lifting-rope, D, is attached to the eye, C, and the latter is provided with a sheave or pulley, $b$, over which the tripping-line, H, passes, as shown.

The hinged tines, E E, are also formed of one continuous piece of rod-metal, and the cross part, G, of these tines passes through the eyes, $a\ a$, formed by bending a single or double turn in the tines A A at that point.

The hinged tines are curved and cross, as shown.

The tripping-line H is attached to some suitable part, as the crossing $d$, and passes through the eye C and over the pulley-sheave $b$, as shown.

The manner of operation of my invention is as follows: The parts B B of the fixed tines and the upper parts of the hinged tines are grasped by the operator, thus holding the hinged tines extended, as shown by the red outline. The fixed tines are thrust down into the hay, and the hinged tines pushed down to bring the corresponding points of each pair of tines in contact, as shown in the drawing. The quantity of hay thus enclosed is lifted, pulling the rope D, which passes over a pulley fixed over head in the manner common to all horse hay-forks. The hinged tines being curved, and the fixed tines being straight or only slightly curved, the greater part of the weight of the hay will rest upon the lower parts of the hinged tines, which lower parts are nearly or quite horizontal. When the hay is sufficiently elevated and brought over the mow or place where it is to be dropped, the tripping-line is pulled, which raises the hinged tines and releases the hay, thereby permitting it to drop from the fork.

The tines may be hinged together by any suitable hinge-device, though the hinge which is shown is simple and effective, and is all that is required.

Having thus described my invention, I claim as new, and desire to secure by Letters Patent—

1. The swinging tines E E G, constructed of one piece of metal, when the parts E E are crossed, as shown, whereby their points are brought obliquely across the points of the fixed tines, as and for the purpose herein set forth.

2. The two pairs of tines A A, B B, each formed on one continuous rod or bar of metal, and hinged together by the cross part G and bent eyes $a\ a$, all substantially as shown and described, and for the purpose set forth.

The above specification of my invention signed by me, this 6th day of April, 1868.

HENRY L. DOANE.

Witnesses:
ROBERT WARDEN,
HENRY L. DEAN.